US012221588B2

(12) United States Patent
Shibayama et al.

(10) Patent No.: US 12,221,588 B2
(45) Date of Patent: Feb. 11, 2025

(54) GREASE COMPOSITION AND SEALING DEVICE USING SAME

(71) Applicants: UCHIYAMA MANUFACTURING CORP., Okayama (JP); KYODO YUSHI CO., LTD., Kanagawa (JP)

(72) Inventors: Masanori Shibayama, Okayama (JP); Koki Ando, Kanagawa (JP); Hiroyuki Saito, Kanagawa (JP); Michitaka Yoshihara, Kanagawa (JP)

(73) Assignees: UCHIYAMA MANUFACTURING CORP., Okayama (JP); KYODO YUSHI CO., LTD., Kanagawa (JP)

( * ) Notice: Subject to any disclaimer, the term of this patent is extended or adjusted under 35 U.S.C. 154(b) by 0 days.

(21) Appl. No.: 18/549,202

(22) PCT Filed: Mar. 8, 2022

(86) PCT No.: PCT/JP2022/010087
§ 371 (c)(1),
(2) Date: Sep. 6, 2023

(87) PCT Pub. No.: WO2022/191206
PCT Pub. Date: Sep. 15, 2022

(65) Prior Publication Data
US 2024/0166966 A1    May 23, 2024

(30) Foreign Application Priority Data
Mar. 9, 2021    (JP) .................................. 2021-036857

(51) Int. Cl.
*C10M 107/02* (2006.01)
*C10M 101/02* (2006.01)
(Continued)

(52) U.S. Cl.
CPC ........ *C10M 107/02* (2013.01); *C10M 101/02* (2013.01); *C10M 105/36* (2013.01);
(Continued)

(58) Field of Classification Search
CPC .............. C10M 107/02; C10M 101/02; C10M 105/36; C10M 115/08; C10M 129/72;
(Continued)

(56) References Cited

U.S. PATENT DOCUMENTS

2009/0136170 A1* 5/2009 Sato ..................... C10M 169/02
508/552
2009/0136172 A1* 5/2009 Egami ................. B60B 27/0005
508/363
(Continued)

FOREIGN PATENT DOCUMENTS

JP    2004-353710 A    12/2004
JP    2005-105025 A    4/2005
(Continued)

OTHER PUBLICATIONS

International Search Report issued in Patent Application No. PCT/JP2022/010087 dated May 17, 2022.

*Primary Examiner* — Ellen M McAvoy
(74) *Attorney, Agent, or Firm* — McDonald Hopkins LLC (57) ABSTRACT

There is provided a grease composition which is supplied between a plurality of lips provided in a sealing device that seals between a pair of members that rotate relative to each other, wherein the grease composition comprises a base oil (A), a thickening agent (B) and a rust preventive agent (C); a kinematic viscosity of the base oil (A) at 40° C. is 30 to 80 $mm^2$/s; the thickening agent (B) is a diurea compound represented by Formula (1); and the composition comprises
(Continued)

5 to 15% by mass of the thickening agent (B) and 0.1 to 2.0% by mass of the rust preventive agent (C) based on the total of the grease composition.

$$R^1\text{—NHCONH—}R^2\text{—NHCONH—}R^3 \quad (1)$$

wherein $R^2$ is a divalent aromatic hydrocarbon group having 6 to 15 carbon atoms, and $R^1$ and $R^3$ are a linear or branched alkyl group having 8 to 22 carbon atoms.

Thus, a grease composition is provided, which can suppress a torque difference due to a rotation direction and exhibits excellent sealing properties.

9 Claims, 4 Drawing Sheets

(51) Int. Cl.
| | | |
|---|---|---|
| *C10M 105/36* | (2006.01) | |
| *C10M 115/08* | (2006.01) | |
| *C10M 129/72* | (2006.01) | |
| *C10M 169/06* | (2006.01) | |
| *C10N 20/02* | (2006.01) | |
| *C10N 30/12* | (2006.01) | |
| *C10N 40/02* | (2006.01) | |
| *C10N 40/34* | (2006.01) | |
| *C10N 50/10* | (2006.01) | |

(52) U.S. Cl.
CPC ........ *C10M 115/08* (2013.01); *C10M 129/72* (2013.01); *C10M 169/06* (2013.01); *C10M 2203/1025* (2013.01); *C10M 2205/003* (2013.01); *C10M 2207/287* (2013.01); *C10M 2215/1026* (2013.01); *C10N 2020/02* (2013.01); *C10N 2030/12* (2013.01); *C10N 2040/02* (2013.01); *C10N 2040/34* (2013.01); *C10N 2050/10* (2013.01)

(58) Field of Classification Search
CPC ........ C10M 169/06; C10M 2203/1025; C10M 2205/003; C10M 2207/287; C10M 2215/1026; C10N 2020/02; C10N 2030/12; C10N 2040/02; C10N 2040/34; C10N 2050/10
See application file for complete search history.

(56) References Cited

U.S. PATENT DOCUMENTS

| | | | |
|---|---|---|---|
| 2009/0208157 A1* | 8/2009 | Egami | C10M 169/02 |
| | | | 508/552 |
| 2013/0170777 A1* | 7/2013 | Ito | F16C 33/6607 |
| | | | 384/445 |
| 2014/0199009 A1* | 7/2014 | Inami | C10M 169/02 |
| | | | 508/528 |
| 2015/0299608 A1 | 10/2015 | Tsutsui et al. | |
| 2018/0087569 A1 | 3/2018 | Inoue et al. | |
| 2021/0355995 A1* | 11/2021 | Sugawara | F16J 15/3256 |
| 2022/0017836 A1 | 1/2022 | Isa et al. | |
| 2022/0162513 A1* | 5/2022 | Shishikura | C10M 169/00 |
| 2022/0348839 A1* | 11/2022 | Miyake | F16C 33/6633 |
| 2022/0403874 A1* | 12/2022 | Sakaguchi | F16C 33/58 |
| 2023/0265886 A1* | 8/2023 | Sakano | F16C 33/805 |
| | | | 384/486 |
| 2024/0084853 A1* | 3/2024 | Kawamura | F16C 19/186 |

FOREIGN PATENT DOCUMENTS

| | | |
|---|---|---|
| JP | 2006-016441 A | 1/2006 |
| JP | 2008-143958 A | 6/2008 |
| JP | 2014-088527 A | 5/2014 |
| JP | 2015-075180 A | 4/2015 |
| JP | 2018-059618 A | 4/2018 |
| JP | 2019-128018 A | 8/2019 |
| JP | 2020-083994 A | 6/2020 |

* cited by examiner

GREASE COMPOSITION AND SEALING DEVICE USING SAME

TECHNICAL FIELD

The present invention relates to a grease composition which is supplied between a plurality of lips provided in a sealing device that seals between a pair of members that rotate relative to each other, and a sealing device using the grease composition.

BACKGROUND ART

In recent years, from the viewpoint of global warming countermeasures, it is required to improve a fuel economy performance of automobiles in order to reduce carbon dioxide emission. Therefore, it is extremely important to reduce sliding resistance (torque) in a hub bearing that rotatably supports an axle of an automobile. Further, in the hub bearing, a rubber sealing material is provided for sealing because it is necessary to prevent foreign matters such as muddy water and dusts from entering the inside of the bearing. A grease composition is used between the sealing member and the opposing member in order to effectively prevent entry of foreign matters and to maintain lubricating performance.

As a grease composition used for a hub bearing, a composition containing a base oil, a thickening agent and a rust preventive agent has been proposed (Patent Reference Nos. 1 to 4). In these references, the base oil used includes mineral oils, synthetic hydrocarbon oils and synthetic ester oils; the thickening agent used includes urea compounds and lithium soap; the rust preventive agent used includes carboxylic-acid rust preventive agents, carboxylic-acid salt rust preventive agents and ester rust preventive agents. By appropriately selecting and combining these materials, a variety of grease compositions have been proposed.

Until now, there has been a problem that a sliding resistance of the sealing device mounted to the hub bearing varies depending on a rotation direction of the wheel. That is, among many hub bearings incorporated with a sealing device, there are those whose torque increases by continuing forward rotation, and those whose torque increases by continuing reverse rotation. Therefore, it is desired that whether the rotation is forward or reverse, increase in torque of the hub bearing is suppressed. However, for conventional grease compositions which are not required to have higher fuel consumption performance, much attention has not been paid to difference in torque between forward rotation and reverse rotation. At present, higher fuel economy performance is required, so that a grease composition capable of reducing such torque difference is desired. At the same time, there has been a need for a grease composition that can prevent leakage of the grease composition from a sealing device and also can prevent intrusion of water at a low temperature or can prevent intrusion of muddy water.

PRIOR ART REFERENCES

Patent References

Patent Reference No. 1: JP 2004-353710 A
Patent Reference No. 2: JP 2006-16441 A
Patent Reference No. 3: JP 2015-75180 A
Patent Reference No. 4: JP 2014-88527 A

SUMMARY OF THE INVENTION

Problems to be Solved by the Invention

To solve the above problems, an objective of the present invention is to provide a sealing device that can reduce a torque difference depending on a rotation direction, and that can prevent leakage of a grease composition from a sealing device and also can prevent intrusion of water at a low temperature or can prevent intrusion of muddy water. Another objective is to provide a grease composition used for such a sealing device.

Means for Solving the Problems

The above problems are solved by providing a grease composition which is supplied between a plurality of lips provided in a sealing device that seals between a pair of members that rotate relative to each other, wherein
the grease composition comprises a base oil (A), a thickening agent (B) and a rust preventive agent (C);
the base oil (A) comprises at least one oil selected from the group consisting of a mineral oil, a synthetic hydrocarbon oil, a synthetic ether oil and a synthetic ester oil; a content of the synthetic ester oil is less than 20% by mass of the total base oil (A); and a kinematic viscosity of the base oil (A) at 40° C. is 30 to 80 mm$^2$/s;
the thickening agent (B) is a diurea compound represented by Formula (1); and
the composition comprises 5 to 15% by mass of the thickening agent (B) and 0.1 to 2.0% by mass of the rust preventive agent (C) based on the total of the grease composition.

$$R^1\text{—NHCONH—}R^2\text{—NHCONH—}R^3 \quad (1)$$

wherein $R^2$ is a divalent aromatic hydrocarbon group having 6 to 15 carbon atoms, and $R^1$ and $R^3$ are a linear or branched alkyl group having 8 to 22 carbon atoms.

Here, it is preferable that the base oil (A) comprises more than 80% by mass and 95% by mass or less of the synthetic hydrocarbon oil and 5% by mass or more and less than 20% by mass of the synthetic ester oil based on the total base oil (A). Furthermore, it is also preferable that the rust preventive agent (C) is a higher fatty acid ester of sorbitan, or an alkenylsuccinic acid or a derivative thereof.

The above problems can be also solved by providing a sealing device for sealing between a pair of members that rotate relative to each other, wherein the above grease composition is supplied between a plurality of lips provided in the sealing device.

Preferably, the sealing device is mounted on a bearing equipped with an inner ring and an outer ring; and the plurality of lips comprises a grease lip oriented in an inner direction of the bearing and a side lip oriented in an outer direction of the bearing. More preferably, the grease lip is not in contact with the inner ring or the outer ring; and there is a plurality of the side lips, two or more of which are in sliding contact with the inner ring or the outer ring. More preferably, the grease lip is in sliding contact with the inner ring or the outer ring, and one or more of the side lips are in sliding contact with the inner ring or the outer ring. Furthermore, particularly preferably, the grease lip is in sliding contact with the inner ring or the outer ring, and there is a plurality of the side lips, two or more of which are in sliding contact with the inner ring or the outer ring.

A suitable embodiment of the present invention is the above sealing device wherein at least one of the side lip or the grease lip is in sliding contact with the polished surface of the inner ring or the outer ring. Another suitable embodiment of the present invention is the above sealing device wherein either the inner ring or the outer ring is provided with a metal slinger; and at least one of the side lip or the grease lip is in sliding contact with the surface of the slinger.

Effects of the Invention

By using a grease composition of the present invention, there can be provided a sealing device that can reduce a torque difference depending on a rotation direction, and that can prevent leakage of a grease composition from a sealing device and also can prevent intrusion of water at a low temperature or can prevent intrusion of muddy water.

MODES FOR CARRYING OUT THE INVENTION

A grease composition of the present invention contains a base oil (A), a thickening agent (B) and a rust preventive agent (C). There will be described these ingredients.

A base oil (A) used in the present invention contains at least one oil selected from the group consisting of a mineral oil, a synthetic hydrocarbon oil, a synthetic ether oil, and a synthetic ester oil. Examples of the mineral oil which can be used include a paraffin mineral oil and a naphthene mineral oil. Examples of a synthetic hydrocarbon oil include a poly α-olefin, a polybutene, and an ethylene-α-olefin copolymer.

Among these preferred is a poly α-olefin which has a higher viscosity index and excellent low-temperature performance. Examples of a synthetic ester oil include a monoester, a diester, a polyol ester and a complex ester. Among these, a polyol ester is preferable, and a pentaerythritol ester which is excellent in low-temperature performance and heat resistance is particularly preferable.

A content of a synthetic ester oil is less than 20% by mass based on the total base oil (A). As a result, it is possible to prevent a rubber material used for the sealing device from swelling and changing its volume. Here, it is preferable that the base oil (A) contains more than 80% by mass and 95% by mass or less of a synthetic hydrocarbon oil and 5% by mass or more and less than 20% by mass of a synthetic ester oil based on the total base oil (A). A given amount of the synthetic ester oil allows for inhibiting volume change due to shrinkage of the rubber material used in the sealing device, and for minimizing a dimensional change. A kinematic viscosity of the base oil (A) at 40° C. is 30 to 80 mm$^2$/s. If a kinematic viscosity is less than 30 mm$^2$/s, grease become liable to leak. A kinematic viscosity is suitably 40 mm$^2$/s or more, more suitably 50 mm$^2$/s or more. If a kinematic viscosity is more than 80 mm$^2$/s, viscous resistance increases, leading to torque increase. A kinematic viscosity is suitably 70 mm$^2$/s or less, more suitably 60 mm$^2$/s or less. A kinematic viscosity of the base oil is a value as determined in accordance with JIS K2283. The base oil (A) is a main ingredient of a grease composition of the present invention, and makes up the rest except the thickening agent (B), the rust preventive agent (C) and a variety of additives.

A thickening agent (B) used in the present invention is a diurea compound represented by Formula (1):

$$R^1—NHCONH—R^2—NHCONH—R^3 \qquad (1)$$

wherein $R^2$ is a divalent aromatic hydrocarbon group having 6 to 15 carbon atoms, and $R^1$ and $R^3$ are a linear or branched alkyl group having 8 to 22 carbon atoms.

A divalent substituent $R^2$ sandwiched between two urea groups in the diurea compound is a divalent aromatic hydrocarbon group having 6 to 15 carbon atoms. Representative examples are substituents represented by Formulas (2) to (4), particularly preferably a substituent represented by Formula (2).

(2)

(3)

(4)

$R^1$ and $R^3$ are a linear or branched alkyl group having 8 to 22 carbon atoms. Preferable examples of $R^1$ and $R^3$ include octyl and stearyl. $R^1$ and $R^3$ can be identical or different. $R^1$ and $R^3$ can contain a small amount of groups other than a linear or branched alkyl group having 8 to 22 carbon atoms as long as the effects of the present invention are not impaired. A specific content is 20 mol % or less, more preferably 10 mol % or less, further preferably 5 mol % or less based on the total mole number of $R^1$ and $R^3$.

The diurea compound used in the present invention can be produced, for example, by reacting a monoamine with an isocyanate at 10 to 200° C. Here, a volatile solvent can be used, but when a base oil (A) is used as a solvent, it can be contained as it is in a composition of the present invention. Examples of a diisocyanate which can be specifically used include aromatic diisocyanates such as diphenylmethane-4, 4'-diisocyanate, 2,4-tolylene diisocyanate, 2,6-tolylene diisocyanate and naphthylene-1,5-diisocyanate and mixtures thereof. Examples of a monoamine include linear or branched alkylamines such as octylamine and stearylamine.

By using such a diurea compound as the thickener (B), there can be provided a sealing device that can reduce torque variation depending on a rotation direction, can prevent leakage of a grease composition from a sealing device and also can effectively prevent intrusion of water at a low temperature. A content of the thickening agent (B) is 5 to 15% by mass based on the total grease composition. If the thickening agent (B) is too little, the grease becomes more leaky. If the thickening agent (B) is too much, consistency of the grease is so reduced that, for example, a discharge resistance generated when the grease is applied to the sealing device by means of the discharge device increases, resulting in significant inconvenience in manufacturing. A content of the thickening agent (B) is preferably 7% by mass or more, more preferably 8% by mass or more. It is preferably 13% by mass or less, more preferably 11% by mass or less.

There are no particular restrictions to the rust preventive agent (C) used in the present invention, and a carboxylic acid and a derivative thereof or a sulfonate can be preferably used. Among these, preferred are a higher fatty acid ester of sorbitan, or an alkenylsuccinic acid or a derivative thereof. Alternatively, as a rust preventive agent (C), a higher fatty acid ester of sorbitan and an alkenylsuccinic acid or a derivative thereof can be combined, or a higher fatty acid ester of sorbitan and an alkenylsuccinic acid or a derivative thereof can be separately used. A content of the rust preventive agent (C) is 0.1 to 2.0% by mass based on the total grease composition. If the rust preventive agent (C) is too little, rust cannot be sufficiently inhibited. If the rust preventive agent (C) is too much, viscosity is so high that low-temperature sealability is deteriorated. A content of the rust preventive agent (C) is preferably 0.2% by mass or more, more preferably 0.3% by mass or more. It is preferably 1.5% by mass or less, more preferably 1% by mass or less.

The grease composition of the present invention preferably contains an antioxidant. With an antioxidant, oxidation degradation of the grease can be inhibited. There are no particular restrictions to an antioxidant used, and an amine antioxidant or a phenolic antioxidant can be used. The content of the antioxidant is, in the light of effects and economic efficiency, generally 0.1 to 5% by mass based on the total grease composition of the present invention. A content of the antioxidant is preferably 0.2% by mass or more and 3% by mass or less.

A worked penetration (1/10 mm) of the grease composition of the present invention is preferably 270 to 310. If a worked penetration is too low, resistance during agitation, that is, an agitation torque may be increased. If a worked penetration is too high, a grease composition may leak. A worked penetration is more preferably 275 or more. It is more preferably 305 or less. A value of the worked penetration is as determined in accordance with JIS K2220 7.

The grease composition of the present invention described above is supplied between a plurality of lips provided in a sealing device which seals between a pair of members that rotate relative to each other. In other words, a preferable embodiment of the present invention is a sealing device for sealing between a pair of members that rotate relative to each other, wherein the grease composition of the present invention is supplied between a plurality of lips provided in the sealing device. Such a lip is made of an elastic rubber material.

An example of a sealing device of the present invention will be described using FIGURES. In an example of FIG. 1, a sealing device 1 is mounted on a bearing equipped with an inner ring 2 and an outer ring 3. A rubber molded article having a plurality of lips is attached to a core metal 4 fixed to the outer ring 3. The rubber molded article has a grease lip 5a oriented in an inner direction of the bearing and side lips (5b, 5c) oriented in an outer direction of the bearing. Both grease lip 5a and side lips (5b, 5c) are elastically pressed to and in sliding contact with the surface 6 of the inner ring 2. The surface 6 is polished. A grease composition of the present invention is supplied to a space 7a surrounded by the grease lip 5a, the side lips 5b and the surface 6, while being supplied to a space 7b surrounded by the side lip 5b, the side lip 5c and the surface 6. Both of these spaces (7a, 7b) are a closed space.

Figure 1:
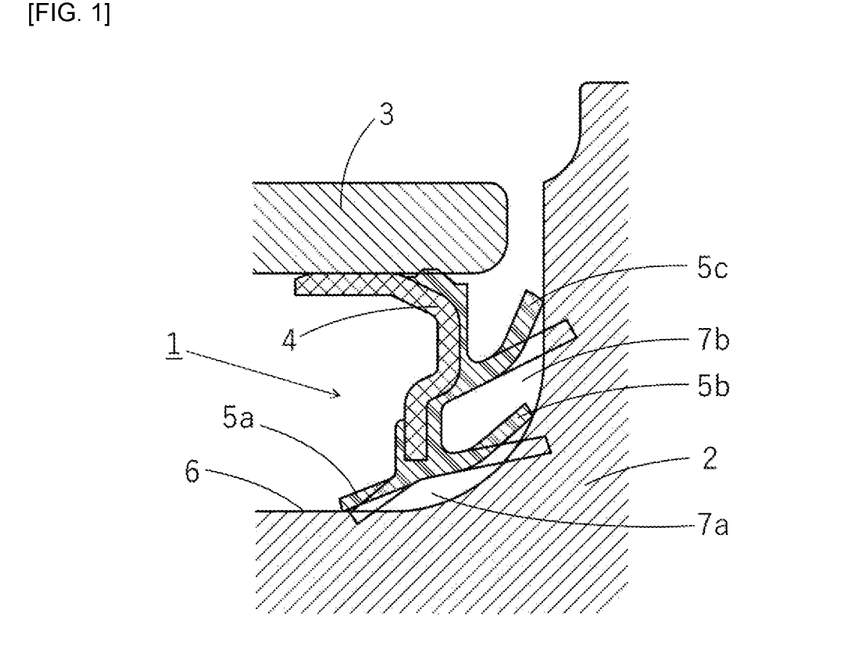
FIG. 1 is a schematic cross-sectional view of an example of a sealing device of the present invention, in which a grease lip and two side lips are in sliding contact with an inner ring.

The grease lip 5a being in sliding contact with the surface 6 can effectively prevent the grease inside of the bearing from leaking. Two side lips (5b, 5c) are in sliding contact with the surface 6, allowing for effectively preventing intrusion of water or contaminants from outside of the bearing. However, there are closed spaces (7a, 7b), so that torque frequently increases during long time operation. Although the reason is not clearly understood, it is supposed that rotation causes pushing out the inner air and the grease, leading to reduction of a pressure in the spaces (7a, 7b) and thus sucker effect. Depending on a sealing device, torque may be increased by forward rotation or reverse rotation, and it is never known until the device is assembled and operated, but it is not realistic to test an individual device for a long time. When the grease composition of the present invention is used, a torque increase amount can be minimized even if a torque increases. Therefore, it is particularly preferable to use the grease composition of the present invention in a sealing device in which a torque tends to be increased due to a plurality of closed spaces (7a, 7b).

As shown in the example of FIG. 1, it is preferable for a sealing device of the present invention that a grease lip is in sliding contact with an inner ring or an outer ring and there is a plurality of side lips, two or more of which are in sliding contact with the inner ring or the outer ring. It is also preferable that at least one of the side lip or the grease lip is sliding contact with the polished surface of the inner ring or the outer ring. Although in the example of FIG. 1, the lip 5 is fixed to the outer ring 3 and the lip 5 is in sliding contact with the inner ring 2, the lip 5 can be fixed to the inner ring 2 and the lip 5 can be in sliding contact with the outer ring 3.

Figure 2:
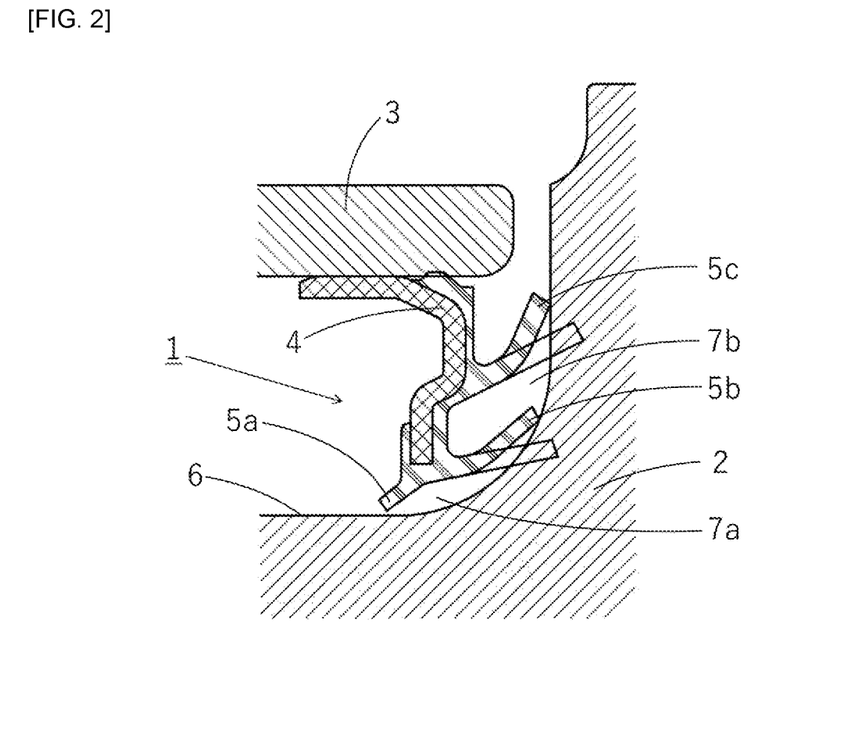
FIG. 2 is a schematic cross-sectional view of an example of a sealing device of the present invention, in which a grease lip is not in sliding contact with the inner ring while two slide lips are in contact with an inner ring.

The example of FIG. 2 is identical to the example of FIG. 1 except that the grease lip 5a is not in sliding contact with the surface 6 of the inner ring 2. The grease composition of the present invention is supplied to the spaces 7a and 7b, and the space 7b is a closed space while the space 7a is open and is connected to the inside of the bearing via a gap between the tip of the grease lip 5a and the surface 6. That is, in this aspect, the grease lip is not in contact with the inner ring or the outer ring, and there is a plurality of side lips, two or more of which are in sliding contact with the inner ring or the outer ring. Thus, since the number of closed spaces is reduced, a sliding resistance is reduced and torque increase is inhibited compared with the example of FIG. 1. In terms of prevention of leakage of the grease within the bearing, performance is lower than the sealing device of FIG. 1.

Figure 3:
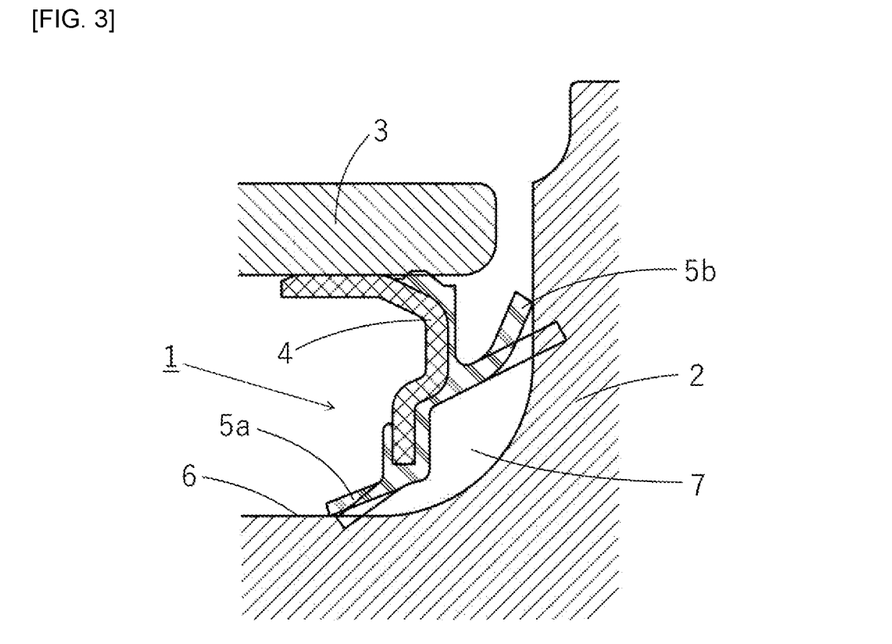
FIG. 3 is a schematic cross-sectional view of an example of a sealing device of the present invention, in which a grease lip and one side lip are in sliding contact with an inner ring.

The example of FIG. 3 is identical to the example of FIG. 1 except that only one side lip 5b is provided. The grease composition of the present invention is supplied to a space 7 surrounded by the grease lip 5a, the side lip 5b and the surface 6. That is, in this aspect, the grease lip is in sliding contact with the inner ring or the outer ring, and one or more side lips are in sliding contact with the inner ring or the outer ring. Since the number of lips in sliding contact is reduced, a sliding resistance is reduced and torque increase is inhibited compared with the example of FIG. 1. In terms of prevention of intrusion of water or contaminants from the outside of the bearing, performance is lower than the sealing device of FIG. 1.

Figure 4:
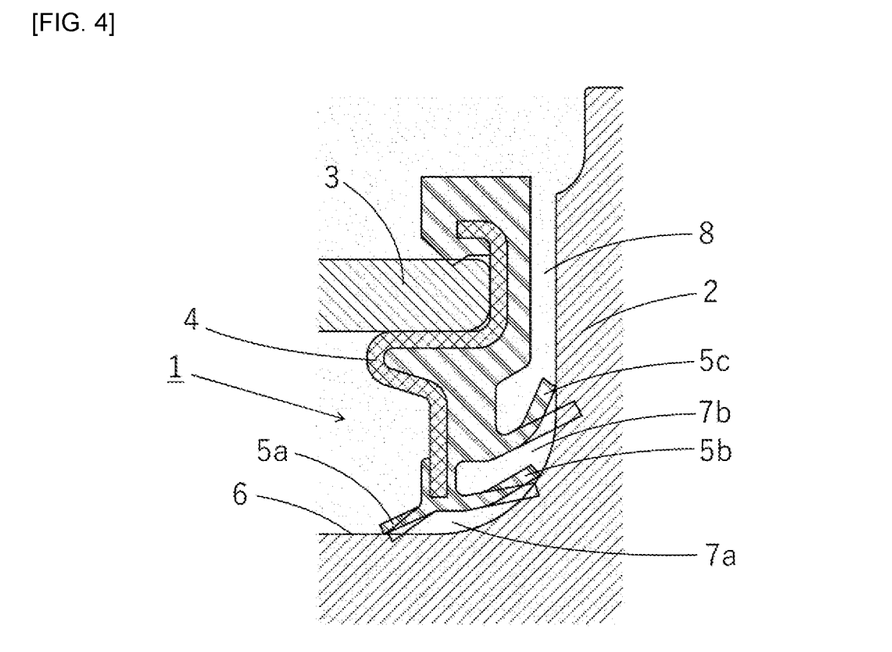
FIG. 4 is a schematic cross-sectional view of an example of a sealing device of the present invention, in which a grease lip and two side lips are in sliding contact with an inner ring and a labyrinth is formed.
Figure 5:
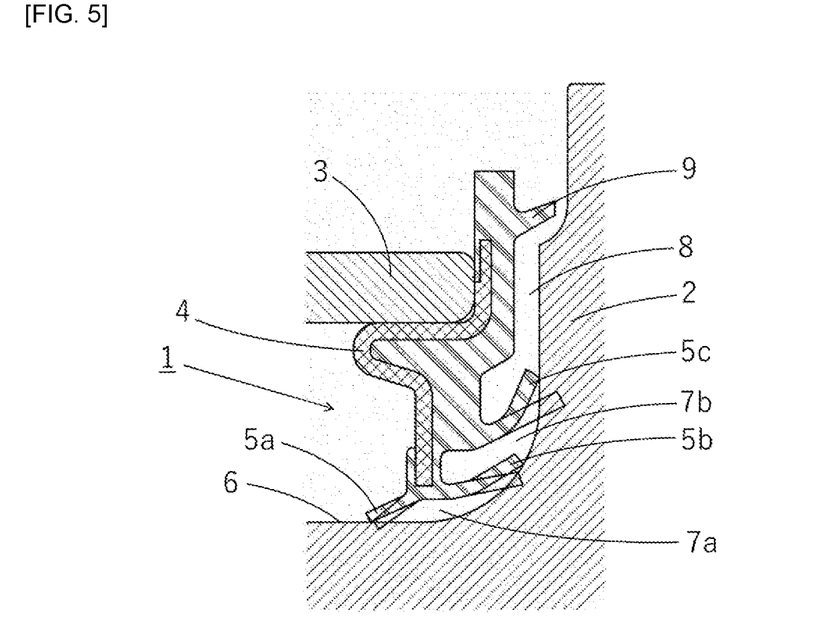
FIG. 5 is a schematic cross-sectional view of an example of a sealing device of the present invention, in which a grease lip and two side lips are in sliding contact with an inner ring and a labyrinth and a projected rim are formed.

The example of FIG. 4 employs the same lip configuration as the example of FIG. 1. Furthermore, a labyrinth 8 is formed in a passage to the outside of the bearing. Thus, performance of preventing intrusion of water or contaminants from the outside of the bearing is improved. Furthermore, in addition to the configuration of the example of FIG. 4, a projected rim 9 is formed at the outlet of the passage to the outside of the bearing in the example of FIG. 5, so that performance of preventing intrusion of water or contaminants from the outside of the bearing is further improved.

Figure 6:
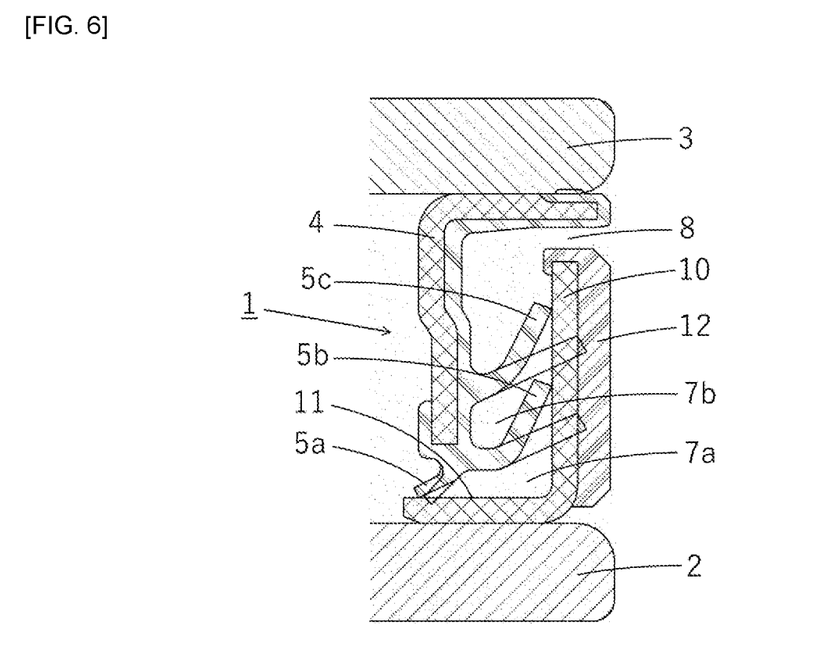
FIG. 6 is a schematic cross-sectional view of an example of a sealing device of the present invention, in which a grease lip and two side lips are in sliding contact with a slinger, to which a magnetic rubber molded article is attached.

In the example of FIG. 6, the sealing device 1 is mounted on a bearing equipped with the inner ring 2 and the outer ring 3. A rubber molded article having a plurality of lips is attached to the core metal 4 fixed to the outer ring 3. The rubber molded article has a grease lip 5a oriented in an inner direction of the bearing and side lips (5b, 5c) oriented in the outer direction of the bearing. A slinger 10 is fixed to the inner ring 2, and both the grease lip 5a and the side lips (5b, 5c) are elastically pressed to and in sliding contact with the surface 11. In the surface 11, dimples are formed for reducing frictional resistance. The grease composition of the present invention is supplied to a space 7a surrounded by the grease lip Sa, the side lip 5b and the surface 11, while being supplied to a space 7b surrounded by the side lip 5b, the side lip 5c and the surface 11. Both of these spaces (7a, 7b) are a closed space. Furthermore, a labyrinth 8 is formed in a passage to the outside of the bearing.

Furthermore, a magnetic rubber molded article 12 is attached to a slinger 10, and functions as a magnetic encoder for detecting a rotation frequency of the axle.

Figure 7:
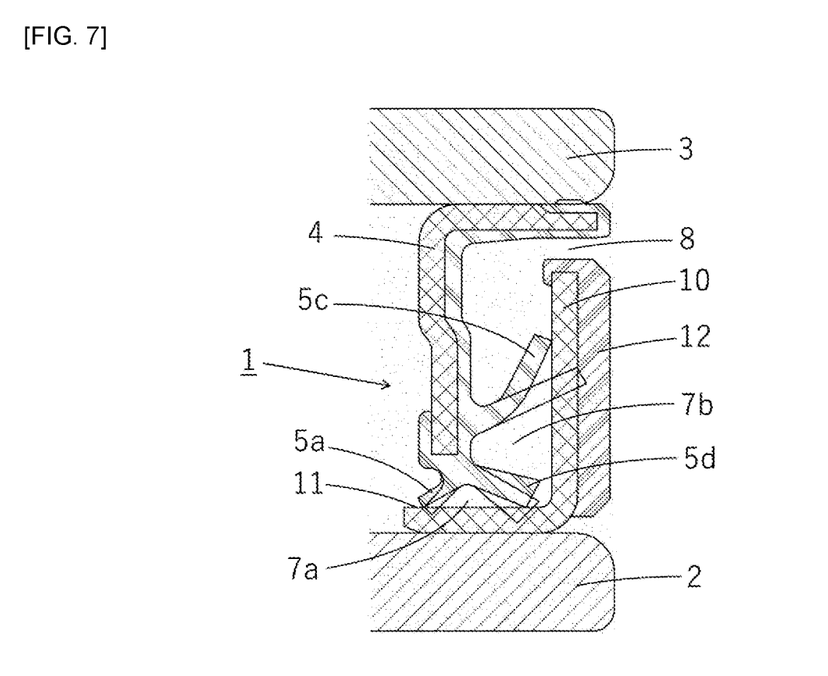
FIG. 7 is a schematic cross-sectional view of an example of a sealing device of the present invention, in which a grease lip, one side lip and one main lip are in sliding contact with a slinger, to which a magnetic rubber molded article is also attached.
Figure 8:
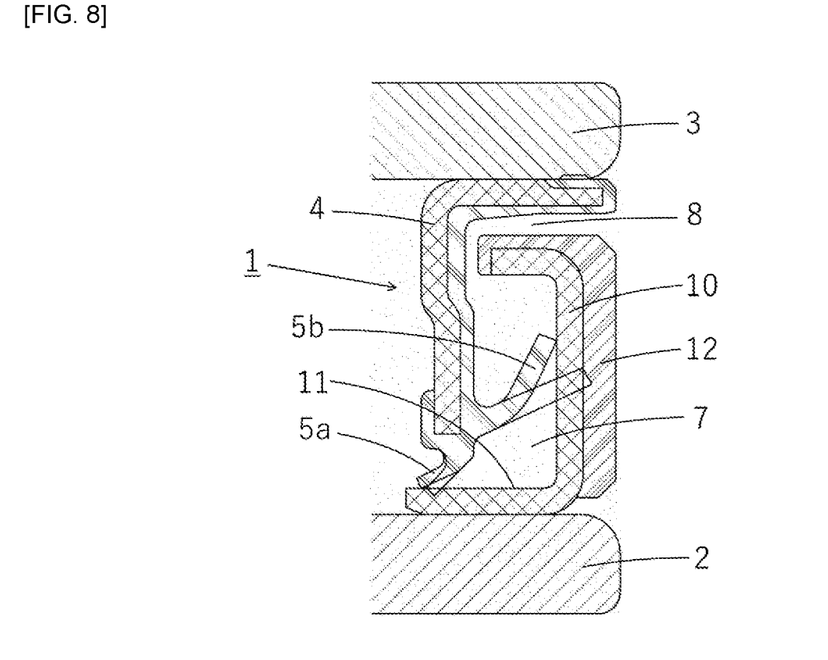
FIG. 8 is a schematic cross-sectional view of an example of a sealing device of the present invention, in which a grease lip and one side lip are in sliding contact with a slinger, to which a magnetic rubber molded article is attached.

The example of FIG. 7 is identical to the example of FIG. 6 except that there is a main lip 5d oriented in a direction of the inner ring instead of the side lip 5b. The example of FIG. 8 is identical to the example of FIG. 6, except that only one side lip 5b is provided and a labyrinth 8 is longer. The grease composition of the present invention is supplied to a space 7 surrounded by the grease lip Sa, the side lip 5b and the surface 11. Since the number of lips in sliding contact is reduced, a sliding resistance is lower than the example of FIG. 6 and torque increase is inhibited. In terms of preventing intrusion of water or contaminants from the outside of the bearing, performance is lower than the sealing device of FIG. 6, but a longer labyrinth 8 compensate it.

As described above, the examples of FIGS. 1 to 8 have a configuration where a plurality of lips is in sliding contact with an inner ring or the surface of a slinger fixed to the inner ring. However, unlike the examples of FIGS. 1 to 8, a configuration where mounting positions of the core metal 4 and the slinger 10 are opposite in a diameter direction. That is, there can be a configuration where the plurality of lips is in sliding contact with an outer ring or the surface of a slinger fixed to the outer ring.

It seems that the presence of a closed space formed between the inner ring, the outer ring or the surface of a slinger fixed to these and a plurality of lips causes a torque difference between forward rotation and reverse rotation. Therefore, when at least two of the grease lip and the side lips are in sliding contact with the surface, the use of the grease composition of the present invention is of great significance. Of course, even when only one of the grease lip and the side lips is in sliding contact with the surface, or when a notch or protrusion is formed in the grease lip, torque increase may occur due to pressure variation within the inside of the bearing, and thus the use of the grease composition of the present invention is effective.

The same is applied to a case where a slinger 10 with no dimples being formed or a case where a magnetic rubber 12 is not attached. When dimples are formed in a sliding-contact surface with which the grease lip or the side lip is in sliding contact, a roughness of the sliding-contact surface can be, for example, Ra 0.3 µm to Ra 1.0 µm. In this case, the use of the grease composition of the present invention is again effective.

EXAMPLES

The present invention will be described using Examples. The test methods in these examples are as follows.

[Torque Stability]

A sealing device 1 as shown in FIG. 1 was prepared, in which a grease composition was supplied between the grease lip 5a and the side lip 5b, and between the side lip 5b and the side lip 5c. The sealing device 1 was mounted on a simulated inner ring and a simulated outer ring, and a rotation torque was measured. Specifically, a simulated inner ring connected to a spindle and a simulated outer ring mounted on the simulated inner ring via a support bearing were prepared, and a string extended from a load cell was attached to the outer surface of the simulated outer ring. By rotating the simulated inner ring with the spindle, the lips (5a, 5b, 5c) in the sealing device 1 came into sliding contact with the simulated inner ring to generate resistance, which was transmitted to the simulated outer ring. Thus, a resistance value (force) transmitted to the simulated outer ring was measured. The resistance value (force) was multiplied with a radius value of the surface of the simulated outer ring with the string to determine as a torque value, and a torque value 4 hours after initiating rotation of the simulated inner ring was obtained. Then, a torque value after forward rotating the simulated inner ring for 4 hours and a torque value after reverse rotating the simulated inner ring for 4 hours were determined, and a ratio of the larger torque value to the smaller torque value was calculated. On the basis of the ratio, a torque difference between forward rotation and reverse rotation was evaluated. Evaluation criteria are as follows.

A: less than 1.2 times
B: 1.2 times or more and less than 1.4 times
C: 1.4 times or more and less than 1.6 times
D: 1.6 times or more

[Mud Water Sealability]

As described for the above "Torque stability" test, a sealing device 1 to which a grease composition was supplied was prepared. The sealing device 1 was incorporated in a mud-water tester (unshown). The sealing device was half-immersed in mud water. The mud-water tester was rotated at a rotation frequency of 1100 r/min for 20 hours and then stopped for 4 hours. This process was one cycle and was repeated. The mud-water tester was equipped with an electric leakage sensor (unshown) for detecting mud water when mud water passed the sealing device 1. A time from initiation of the mud water test to detection of mud water was measured and on the basis of the time, mud water sealability was evaluated in accordance with the following criteria.

A: 15 cycles or more
B: less than 15 cycles

[Low Temperature Sealability]

In this test, a sealing device of the sealing device as shown in FIG. 7 without a side lip 5c was prepared instead of the sealing device 1 used in the above [Mud water sealability] test, for shortening testing time. To this sealing device was supplied a grease composition as described for the above [Torque stability] test. This sealing device was incorporated into the mud water tester filled with salt water instead of mud water, and the sealing device was half-immersed in salt water. Under the atmosphere at −20° C., the tester was rotated at a shaft (inner ring) rotation frequency of 500 r/min and a time until salt water at −20° C. passed the sealing device was measured. The test results were evaluated in accordance with the following criteria.

A: 15 min or more
B: 6 min or more and less than 15 min
C: 3 min or more and less than 6 min
D: less than 3 min

[Grease Leakage]

As described in the above [Torque stability] test, a sealing device 1 to which a grease composition was supplied was prepared. The sealing device 1 was incorporated in a tester for detecting grease leakage (unshown), the tester was rotated at a rotation frequency of 650 r/min for 4 hours, and then the sealing device 1 was removed from the tester. Then, the grease composition protruding from the side lip 5c of the sealing device 1 was visually observed and grease leakage was evaluated in accordance with the following criteria.

A: No protrusion from the side lip;
B: Protruding to the center point between the side lip and the outer edge of the inner ring flange, or to just in front of the center point;
C: Protruding beyond the center point between the side lip and the outer edge of the inner ring flange, but did not reach the outer edge;
D: Protrusion reached the outer edge of the inner ring flange.

The starting materials used for preparing a grease composition were as follows.

(Base Oil)
Base oil a: mineral oil (40° C. kinematic viscosity 17.6 mm$^2$/s)
Base oil b: a poly-α-olefin (40° C. kinematic viscosity 17.8 mm$^2$/s)
Base oil c: a poly-α-olefin (40° C. kinematic viscosity 30.4 mm$^2$/s)
Base oil d: a poly-α-olefin (40° C. kinematic viscosity 48.5 mm$^2$/s)
Base oil e: a poly-α-olefin (40° C. kinematic viscosity 3400 mm$^2$/s)
Base oil f: a pentaerythritol ester oil (kinematic viscosity 30.5 mm$^2$/s)

(Rust Preventive Agent)
Rust preventive agent a: an amine rust preventive agent
Rust preventive agent b: sorbitan trioleate
Rust preventive agent c: a succinic acid half ester (Antioxidant)
Antioxidant a: a diphenylamine antioxidant (Thickening Agent)
Thickening agent a: a diurea compound of a reaction product of MDI with OA
Thickening agent b: a diurea compound of a reaction product of MDI with PT
Thickening agent c: a diurea compound of a reaction product of MDI with ODA/CHA (molar ratio:ODA 1 mol/CHA 7 mol)
Thickening agent d: a lithium complex
where, MDI is 4,4'-diphenylmethane diisocyanate; OA is octylamine; PT is p-toluidine; ODA is stearylamine; and CHA is cyclohexylamine.

Example 1

75 parts by mass of Base oil c, 13 parts by mass of Base oil e and 12 parts by mass of Base oil f were blended to give 100 parts by mass of a base oil (kinematic viscosity 54 mm$^2$/s). In this base oil, MDI and OA were reacted, heated, and cooled to give a urea base grease. Here, these were added at a proportion of MDI 1 mol to OA 2 mol. To the base grease thus obtained were added 0.5 parts by mass of Rust preventive agent b, 0.2 parts by mass of Rust preventive agent c and 0.5 parts by mass of Antioxidant a, and the mixture was stirred to give a grease composition. A worked penetration (1/10 mm) of the grease composition thus obtained was 290. Using the grease composition, torque stability, mud water sealability, low temperature sealability and grease leakage as described above were evaluated. Formulations and evaluation results are summarized in Table 1.

Example 2 and Comparative Examples 1 to 5

A grease composition was produced as described in Example 1, except that the types and contents of starting materials were changed as shown in Table 1. Using the grease composition, torque stability, mud water sealability, low temperature sealability and grease leakage as described above were evaluated. Formulations and evaluation results are summarized in Table 1.

Comparative Examples 6 and 7

50 parts by mass of Base oil a and 50 parts by mass of Base oil b were blended to give 100 parts by mass of a base oil (kinematic viscosity 17.6 mm$^2$/s). To this base oil was added 12-hydroxystearic acid, and the mixture was heated to a temperature (80 to 90° C.) at which a completely transparent liquid was obtained. To the mixture was added a solution preliminarily prepared by adding lithium hydroxide monohydrate to water which was then heated to be a solution. Then, the mixture was vigorously stirred for initiating saponification reaction of 12-hydroxystearic acid, to form a lithium salt of 12-hydroxystearic acid. Subsequently, azelaic acid was added and the mixture was stirred until it became homogeneous state. To the mixture was added a solution preliminarily prepared by adding lithium hydroxide monohydrate to water which was then heated to be a solution. Then, the mixture was vigorously stirred for initiating saponification of azelaic acid. After about 60 min, it was determined by infrared spectrometry that no absorptions of unreacted fatty acid were observed, and then the saponification reaction was terminated. Then, in the heating process, the content was gradually heated to 200° C. When a temperature reached 200° C., the remaining base oil was added and the mixture was allowed to be cooled to room temperature to give a base grease of a lithium complex. To the base grease thus obtained were added 0.3 parts by mass of Rust preventive agent a and 0.5 parts by mass of Antioxidant a, to give a grease composition. Using the grease composition obtained, torque stability, mud water sealability, low temperature sealability and grease leakage as described above were evaluated. Formulations and evaluation results are summarized in Table 1.

TABLE 1

|   |   | Example 1 | Example 2 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Base oil (A) | a: Mineral oil (17.6 mm²/s) |   |   | 50 | 50 |   |   |   | 50 |   |
|   | b: PAO (17.8 mm²/s) |   |   | 50 | 50 | 85 |   |   | 50 |   |
|   | c: PAO (30.4 mm²/s) | 75 | 75 |   |   |   | 88 | 75 |   | 60 |
|   | d: PAO (48.5 mm²/s) |   |   |   |   |   |   |   |   | 21 |
|   | e: PAO (3400 mm²/s) | 13 | 13 |   |   |   | 12 | 13 |   |   |
|   | f: Ester (30.5 mm²/s) | 12 | 12 |   |   | 15 |   | 12 |   | 19 |
| Thickening agent (B) | a: Aliphatic diurea | 9.4 | 11.5 | 10.5 |   |   |   |   |   |   |
|   | b: Aromatic diurea |   |   |   | 22 |   |   |   |   |   |
|   | c: Alicyclic diurea |   |   |   |   | 15 | 10.5 | 11.7 |   |   |
|   | d: Li soap |   |   |   |   |   |   |   | 12 | 11 |
| Rust preventive agent (C) | a: Amine |   |   | 0.3 | 0.3 | 0.3 |   |   | 0.3 | 0.3 |
|   | b: Sorbitan trioleate | 0.5 | 0.5 |   |   |   | 2 |   |   |   |
|   | c: Succinic acid half ester | 0.2 |   |   |   |   |   | 1 |   |   |
| Antioxidant | a: Diphenyl amine | 0.5 | 0.5 | 0.5 | 0.5 | 0.5 | 0.5 | 0.5 | 0.5 | 0.5 |
| 40° C. Kinematic viscosity of a base oil (mm²/s) |   | 54 | 54 | 17.6 | 17.6 | 18.1 | 54 | 54 | 17.6 | 40 |
| Worked penetration (¹/₁₀ mm) |   | 290 | 280 | 300 | 300 | 280 | 300 | 280 | 280 | 280 |
| Torque stability |   | A | B | A | C | B | B | B | A | B |
| Mud water sealability |   | A | A |   | A | A | A | A |   |   |
| Low temperature sealability |   | A | A |   | A |   | C | C | D | D |
| Grease leakage |   | A | A | D | B | D | C | B | D | C |

DESCRIPTION OF SYMBOLS

1: Sealing device
2: Inner ring
3: Outer ring
4: Core metal
5: Lip
5a: Grease lip
5b, 5c: Side lip
5d: Main lip
6, 11: Surface
7, 7a, 7b: Space
8: Labyrinth
9: Projected rim
10: Slinger
12: Magnetic rubber molded article

The invention claimed is:

1. A grease composition which is supplied between a plurality of lips provided in a sealing device that seals between a pair of members that rotate relative to each other, wherein
the grease composition comprises a base oil (A), a thickening agent (B) and a rust preventive agent (C);
the base oil (A) comprises more than 80% by mass and 95% by mass or less of the synthetic hydrocarbon oil and 5% by mass or more and less than 20% by mass of the synthetic ester oil based on the total base oil (A); and a kinematic viscosity of the base oil (A) at 40° C. is 30 to 80 mm²/s;
the thickening agent (B) is a diurea compound represented by Formula (1);

$$R^1\text{—NHCONH—}R^2\text{—NHCONH—}R^3 \qquad (1)$$

wherein $R^2$ is a divalent aromatic hydrocarbon group having 6 to 15 carbon atoms, $R^1$ and $R^3$ are a linear or branched alkyl group having 8 to 22 carbon atoms, and a content of groups other than a linear or branched alkyl group having 8 to 22 carbon atoms is 10 mol % or less based on the total mole number of $R^1$ and $R^3$, and the composition comprises 5 to 15% by mass of the thickening agent (B) and 0.1 to 2.0% by mass of the rust preventive agent (C) based on the total of the grease composition.

2. The grease composition according to claim 1, wherein the rust preventive agent (C) is a fatty acid ester of sorbitan, or an alkenylsuccinic acid or a derivative thereof.

3. A sealing device for sealing between a pair of members that rotate relative to each other, wherein
the grease composition according to claim 1 is supplied between a plurality of lips provided in the sealing device.

4. The sealing device according to claim 3, wherein
the sealing device is mounted on a bearing equipped with an inner ring and an outer ring; and
the plurality of lips comprises a grease lip oriented in an inner direction of the bearing and a side lip oriented in an outer direction of the bearing.

5. The sealing device according to claim 4, wherein the grease lip is not in contact with the inner ring or the outer ring; and there is a plurality of the side lips, two or more of which are in sliding contact with the inner ring or the outer ring.

6. The sealing device according to claim 4, wherein the grease lip is in sliding contact with the inner ring or the outer ring, and one or more of the side lips are in sliding contact with the inner ring or the outer ring.

7. The sealing device according to claim 4, wherein the grease lip is in sliding contact with the inner ring or the outer ring, and there is a plurality of the side lips, two or more of which are in sliding contact with the inner ring or the outer ring.

8. The sealing device according to claim 4, wherein at least one of the side lip or the grease lip is in sliding contact with the polished surface of the inner ring or the outer ring.

9. The sealing device according to claim 4, wherein
either the inner ring or the outer ring is provided with a metal slinger; and
at least one of the side lip or the grease lip is in sliding contact with the surface of the slinger.

\* \* \* \* \*

UNITED STATES PATENT AND TRADEMARK OFFICE
CERTIFICATE OF CORRECTION

PATENT NO. : 12,221,588 B2
APPLICATION NO. : 18/549202
DATED : February 11, 2025
INVENTOR(S) : Masanori Shibayama et al.

It is certified that error appears in the above-identified patent and that said Letters Patent is hereby corrected as shown below:

In the Specification

Column 7, Line 47, delete "grease lip Sa, the side" and insert --grease lip 5a, the side--.

Column 7, Line 61, delete "grease lip Sa, the side" and insert --grease lip 5a, the side--.

Signed and Sealed this
Seventeenth Day of June, 2025

Coke Morgan Stewart
*Acting Director of the United States Patent and Trademark Office*